United States Patent [19]

Aschwanden et al.

[11] Patent Number: 4,894,716
[45] Date of Patent: Jan. 16, 1990

[54] T.V. MOTION DETECTOR WITH FALSE ALARM IMMUNITY

[75] Inventors: Felix Aschwanden, Thalwil; Theodor E. Bart, Kindhausen, both of Switzerland

[73] Assignee: Burle Technologies, Inc., Lancaster, Pa.

[21] Appl. No.: 341,076

[22] Filed: Apr. 20, 1989

[51] Int. Cl.⁴ .............................................. H04N 7/18
[52] U.S. Cl. ..................................... 358/105; 358/108
[58] Field of Search ............... 358/108, 96, 108, 125, 358/126, 93

[56] References Cited

U.S. PATENT DOCUMENTS

| | | | |
|---|---|---|---|
| 3,823,261 | 7/1974 | Bolsey | 358/105 |
| 4,160,998 | 7/1979 | Kamin | 358/105 |
| 4,198,653 | 4/1980 | Kamin | 358/105 |
| 4,240,109 | 12/1980 | Michael | 358/105 |
| 4,270,143 | 6/1981 | Morris | 358/125 |
| 4,546,383 | 10/1985 | Abramatic et al. | 358/96 X |
| 4,597,010 | 6/1986 | Carr | 358/136 |
| 4,630,114 | 12/1986 | Bergmann | 358/136 |
| 4,639,773 | 1/1987 | Hurst | 358/105 |
| 4,661,853 | 4/1987 | Roeder | 358/167 |
| 4,688,089 | 8/1987 | Uhlenkamp | 358/105 |
| 4,703,358 | 10/1987 | Flannaghan | 358/167 |

Primary Examiner—James J. Groody
Assistant Examiner—Victor R. Kostak
Attorney, Agent, or Firm—Martin Fruitman

[57] ABSTRACT

A motion detector which compares the video signal from a camera to a camera signal from an earlier scene and produces an alarm signal if an edge of any object has changed its position, but protects against false signals. A phase detector is used to sense movement in only the edges of objects and a vertical coincidence circuit requires object movement in several vertical video lines to prevent false signals from such small items as raindrops. Several adjacent horizontal areas must also show movement in order to activate an alarm.

5 Claims, 3 Drawing Sheets

T.V. MOTION DETECTOR WITH FALSE ALARM IMMUNITY

SUMMARY OF THE INVENTION

This invention deals generally with pictorial transmission by television and more specifically with detection of motion between successive scenes.

There are generally two categories of television motion detectors presently available. The simpler of the two compares the average light levels within a particular area of the TV picture at two different times, and indicates motion if the two light levels differ. These systems optimistically assume that only motion of an object within the field of view will change the light level, but this is obviously in error. Changes in general illumination of the scene will falsely indicate motion, and this is a common fault with such systems.

A second, more sophisticated, type of motion detector digitizes the video signal and processes it through a computer for picture recognition. One difficulty with this system is the cost and complexity of handling the tremendous data volume generated by a TV camera. Also, the very quantity of data generated and compared means that noise signals are more likely to affect the comparison and generate false indications of motion. If all that is required to indicate motion is a difference in one picture element, it is almost certain that such a difference will occur in successive scenes merely because of the generation of electronic noise.

Moreover, many scenes include some motion that is inconsequential and should be ignored. If, for instance, a motion detector is being used with a closed circuit television system to guard a storage yard, no alarm should be generated if a raindrop or leaf falls through the field of view.

The present invention solves all of these problems. It does not respond to changes in general illumination, nor to incidental motion of small objects such as raindrops, leaves or insects. Moreover, it requires only a very reasonable data processing capability, far less than required to monitor every picture element, and it still can detect all significant motion.

This is accomplished by processing signal from only the edges of objects within the camera view. That is, the system stores the location of all the distinct changes of light intensity, the edges, which occur in the TV scene using only a binary signal to indicate the presence or absence of each edge. Then the same observation is made for a subsequent scene, and the comparison is made to note whether any of the previous edges have moved.

The electronic signal processing of the invention also is designed to anticipate those signals which are considered inconsequential. For instance, a vertical coincidence circuit is used to require the edge with movement to exist in several adjacent horizontal lines, in order to prevent small items such as raindrops from indicating motion. Also, another circuit requires a specific minimum motion in the horizontal direction, so that an oscillating motion such as that of a tree branch does not trigger an alarm.

The present invention therefore furnishes a reliable motion detector which uses only a very practical size memory and anticipates and eliminates the most common sources of false alarms.

DETAILED DESCRIPTION OF THE INVENTION

Figure 1:
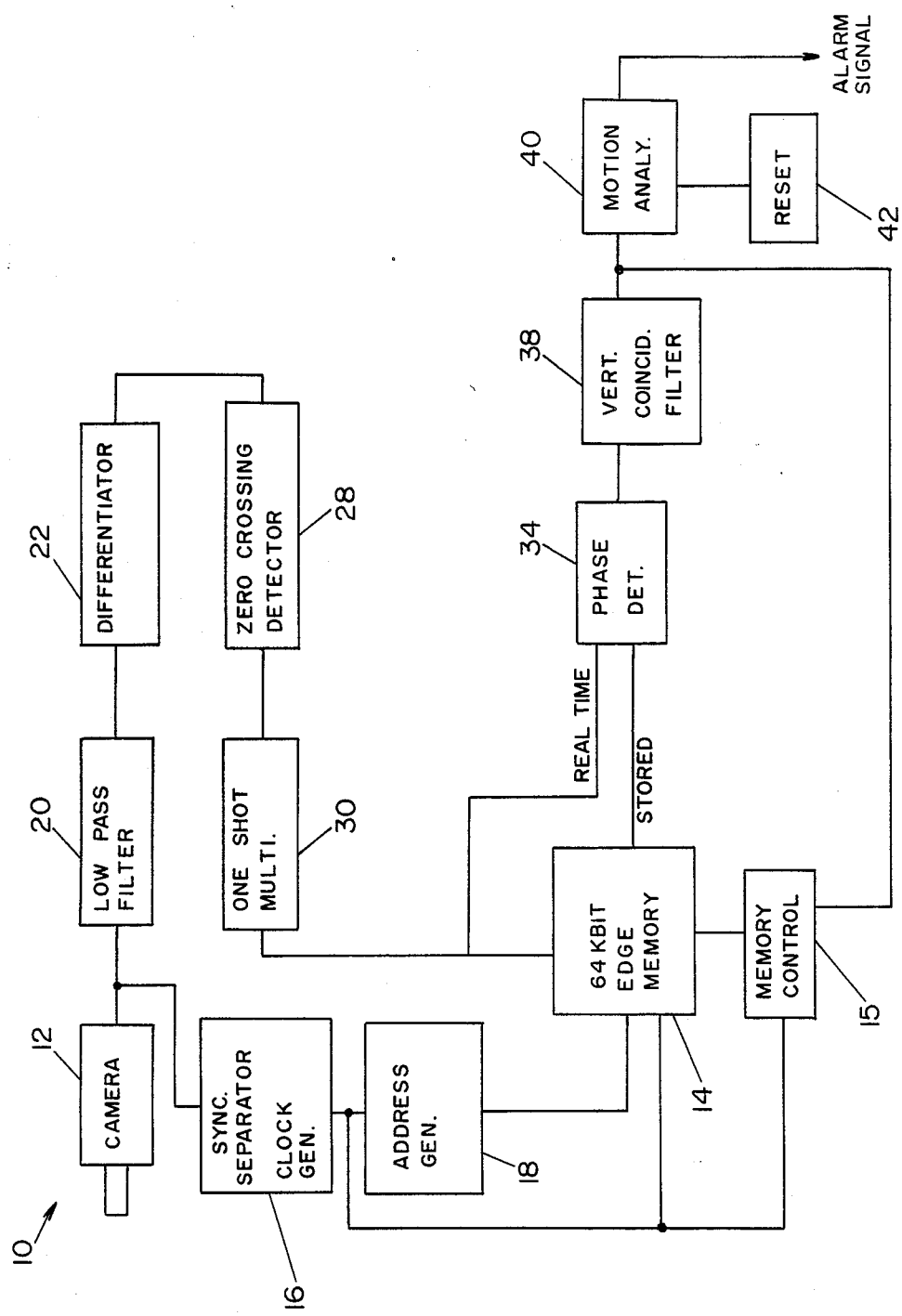
FIG. 1 is a simplified block diagram of the preferred embodiment of the invention.

FIG. 1 is a simplified block diagram of the preferred embodiment of the invention in which motion detector 10 analyzes the field of view of camera 12 to determine whether any significant motion has taken place between successive camera scanning fields. Motion detector 10 has several features which are described below which make it particularly immune to false motion signals, but it is also designed to minimize the size of the memory required for the comparison of two viewing fields.

The basic function of motion detector 10 is to determine whether an edge of an object within the TV field has moved. This is accomplished by storing only the edges of items within the field rather than storing information on the entire object, and thereby reducing the required memory. A single bit of information is therefore sufficient to indicate the presence or absence of an edge. In the preferred embodiment a 64 kbit memory is used for memory 14 to provide for 256 vertical lines of the TV field and for 256 samples per line. Each memory address then represents the potential location of an edge.

These memory addresses for memory 14 are generated directly from the signal from camera 12 by sync separator 16 which extracts the horizontal and vertical signals and generates a clock locked to the horizontal line frequency of approximately 5 MHZ and feeds them to address generator 18 which then supplies the addresses to memory 14.

The video signal from camera 12 is also fed to low pass filter 20 which fulfills the Nyquist criterion and also suppresses very fine detail in the video signal such as would result from raindrops or flies. A band width of 0.5 MHZ or less for filter 20 has been found to be satisfactory for operation of the following circuit stages.

Figure 2:
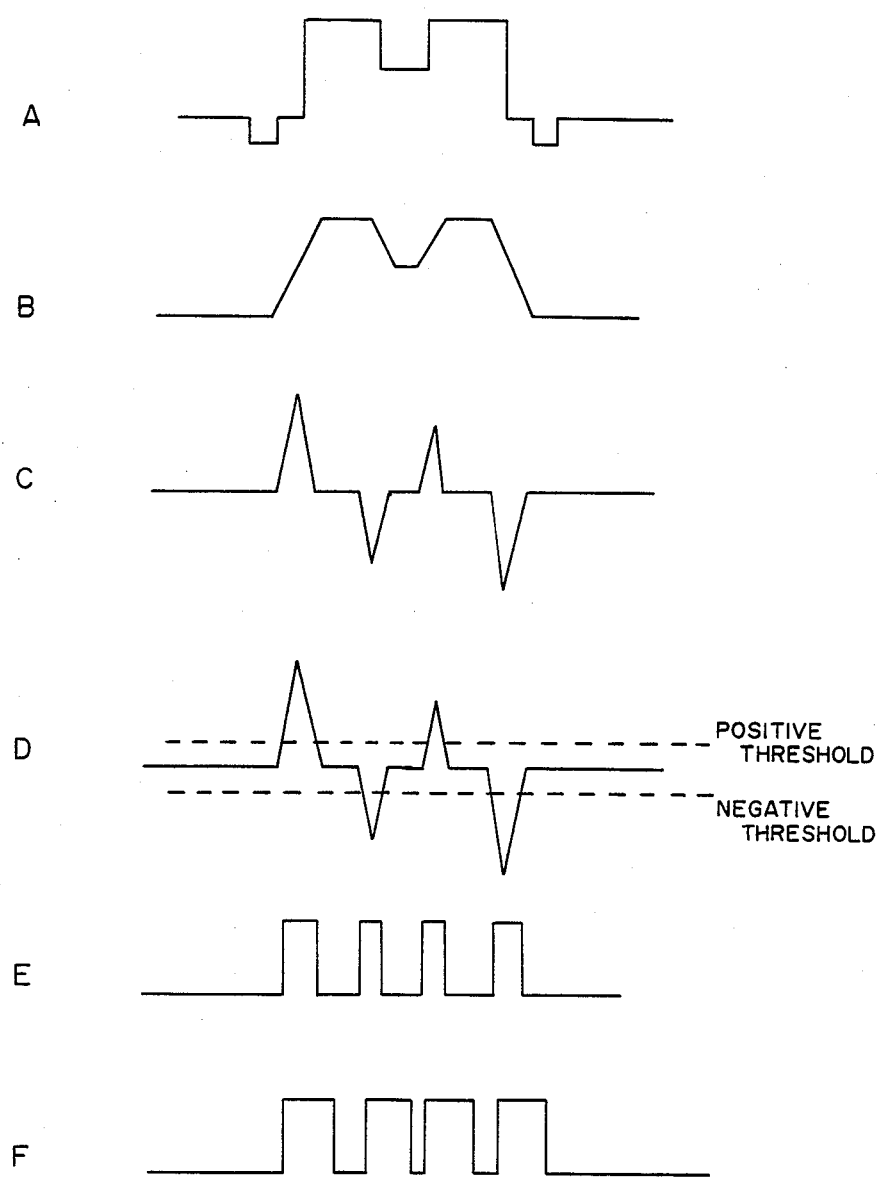
FIG. 2 shows representative signal waveforms within the preferred embodiment.

FIG. 2 depicts several representative signal waveforms within the preferred embodiment of the invention which would occur for a single horizontal scan line of camera 12 if it were viewing a field with a white background on both sides of a centered gray band. FIG. 2A is a simplified drawing of the signal waveform passed from camera 12 to low pass filter 20, and FIG. 2B is the resulting waveform on the output of low pass filter 20.

The signal from low pass filter 20 is then fed to first differentiator 22 which produces a waveform represented by FIG. 2C indicating only the edges of the gray band in the center of the camera field. This signal has a zero crossing point related in time to each positive edge in the camera field (FIG. 2D), and zero crossing detector 28 then converts the analog signal which exists on its input to a digital output signal by sensing the exact time of the zero crossing and producing a signal related to that time.

The output of zero crossing detector 28 (FIG. 2E) is fed to and triggers one-shot multivibrator 30 which then produces digital pulses (FIG. 2F) of standard width exactly corresponding to the edges. These are fed to memory 14 and the following digital processing circuitry.

Memory 14 can be controlled by memory control 15 as to when it will produce an output for comparison to the real-time digital signal being fed to the comparison circuit and when the real time digital signal will be stored in memory 14.

For instance, since standard TV fields actually alternate interlaced fields, it is hardly necessary to compare fields more frequently than every other field. Comparing every other field also makes it more likely that slow movement will be detected, and it is possible to use a manual control to set memory 14 to furnish outputs at longer periods, for instance, every third or seventh camera field, to sense even slower movement. It is also practical, as shown in FIG. 1 to automatically control memory control 15 with a feedback signal generated by a following stage 38 of motion detector 10. In that manner, a field which has already been stored in memory 14 can be maintained in memory 14 until a subsequent comparison determines that there actually has been movement or sufficient noise has built up to require the memory to be erased. Such automatic control makes it impossible to move too slowly for detection.

The comparison function of motion detector 10 is performed by the circuitry following memory 14. The real-time pulses from one shot multivibrator 30 and the pulses from the previously selected TV field in memory 14 are both fed to phase detector 34, which is the first of several signal verification circuits.

Phase detector 34 is a circuit which essentially detects the difference in the timing of the same edge pulse in the real-time field and the stored field. Any difference is an indication that the edge has moved. Phase detector 34 also includes a minimum level circuit which requires a certain preset minimum time difference before it produces an output signal. This circuit is the essential protection against signal noise. Since signal noise is likely to cause jitter of the order of one clock pulse, no output signal is generated by phase detector 34 unless the time difference between edge pulses is greater than one clock pulse.

Figure 3:
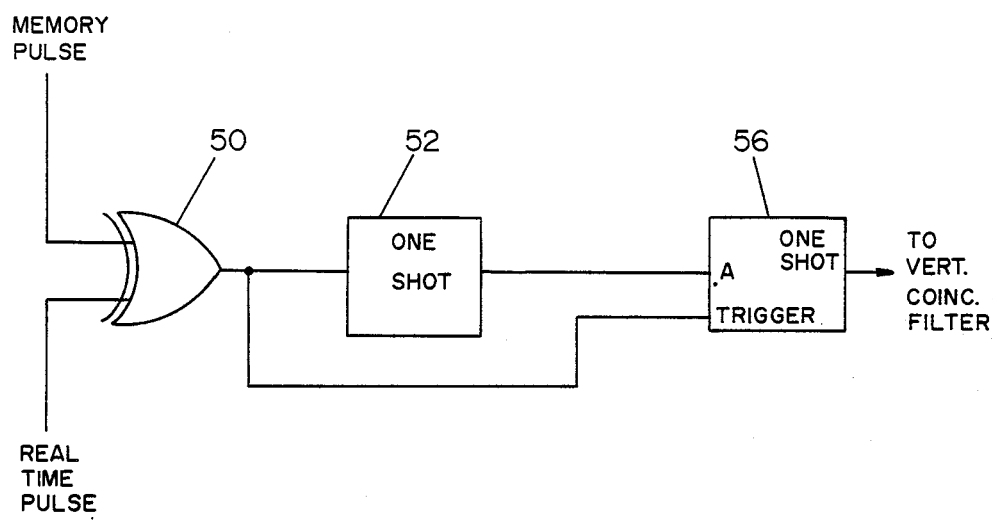
FIG. 3 is a simplified block diagram of the phase detector of the preferred embodiment.

As shown in FIG. 3, within phase detector 34 the real-time pulses from one shot multivibrator 30 and the pulses from memory 14 are fed to XOR gate 50.

The output of XOR gate 50 is fed to monostable multivibrator 52, typically referred to as a "one-shot". One shot 52 produces a rectangular pulse of a fixed pulse length each time XOR gate 50 shuts off. Therefore, one shot 52 will produce an output only when there have been edge differences from real-time one shot 30 and from m emory 14, which turned on XOR gate 50, and then one or both of the pulses ends.

Meanwhile, XOR gate 50 will initiate the second one shot 56 if it is giving an output when one shot 52 is not putting a signal on the input of one shot 56.

Since the "A" input signal of one shot 56 stops at the end of the output from one shot 52 and the trigger signal for one shot 56 from XOR gate 50 ends with the end of the last of the real-time and stored edge pulses, the length of the output pulse from one shot 52 determines the maximum time difference permitted between the real-time and stored edges before a movement is indicated by one shot 56. It is this feature which prevents mere jitter from initiating a movement signal The output pulse fed from phase detector 34 to vertical coincidence filter 38 is actually an alarm signal which could be used to initiate some warning action, because it is a true indication that an edge in the TV field has in fact moved, but there are certain movements that clearly should be ignored, For instance, any edge movement which exists in only one horizontal scan line is clearly insignificant. It is either a small harmless object such as a fly or raindrop, or it may be a result of electrical signal noise. Vertical coincidence filter 38 therefore uses an additional memory to store an output alarm pulse from phase detector 34 for a specified additional number of horizontal scan lines. In the preferred embodiment, the number of horizontal scan lines has been selected to be four. Therefore, a first output signal from phase detector 34 begins a count within vertical coincidence filter 38 but no output is generated by vertical coincidence filter 38 unless three more motion indicating pulses occur in the next horizontal scan lines in approximately the same location as the first pulse. In effect, vertical coincidence filter 38 adds a minimum height requirement to any moving object before an output signal is fed to motion analyzer 40.

Motion analyzer 40 then adds a requirement of a minimum horizontal movement. In the preferred embodiment this mimimum may be selected by the user to be 5, 10 or 15 percent of the horizontal scan line. Such a requirement can easily be set for each application by motion analyzer 40.

Motion analyzer 40, by holding off an alarm signal output unless an object moves a minimum distance, prevents alarms from oscillating objects such as tree branches or waving flags. Motion analyzer 40 uses an additional memory to accumulate the indicators of movement in the TV field and the memory is continuously read out so that an alarm output signal is generated by motion analyzer 40 only if the required minimum motion exists.

The output alarm signal from motion analyzer 40 is the actual output of motion detector 10 and can be used to alert guards or cause other actions.

The alarm signal from motion detector 10 is not only extremely sensitive but is also particularly immune from false alarms, because of the protection against false alarms furnished by vertical coincidence filter 38 which requires a moving object to have a minimum height and motion analyzer 40 which requires the motion to have a minimum horizontal movement. Together these features furnish a very reliable, but quite economical motion detector for television viewed fields.

It is to be understood that the form of this invention as shown is merely a preferred embodiment. Various changes may be made in the function and arrangement of parts; equivalent means may be substituted for those illustrated and described; and certain features may be used independently from others without departing from the spirit and scope of the invention as defined in the following claims.

What is claimed as new and for which Letters Patent of the United States are desired to be secured is:

1. In a motion detector for a television viewing field of the type in which a television camera's output signal is processed in series by a low pass filter, a differentiator, a zero crossing detector and digital pulse generator so that digital signals related to edges visible in the viewing field are furnished to a following storage memory and to a comparison circuit which receives the real-time signals from the digital pulse generator and also the stored signals of a previous field from the storage memory and compares them and produces an alarm output signal if a difference between them indicates edge movement, the improvement wherein the comparison circuit comprises a phase detector circuit comprising an XOR gate receiving the real-time and stored signals with the XOR gate output connected to a first monostable multivibrator whose output is connected to a first input of a second monostable multivibrator and with the XOR gate output also connected to a second trigger input of the second monostable multivibrator, the output of which produces a motion indicating signal only when the difference in real-time and stored signals surpasses the output pulse length of the first monostable multivibrator.

2. The motion detector of claim 1 further including a memory control for the storage memory, the memory control being variable to control how often a TV viewing field will be stored within the storage memory and how often stored field signals will be furnished to the comparison circuit.

3. The motion detector of claim 1 further including a memory control for the storage memory, the memory control being interconnected with a signal source following the comparison circuit, the signal source being dependent upon the determination of edge movement by the comparison circuit so that a stored field is maintained within the storage memory until some edge movement is determined.

4. The motion detector of claim 1 further including a vertical coincidence filter which receives as input signals the output signals from the phase detector circuit when the phase detector circuit determines that edge motion in a horizontal scan line has occurred, and wherein the vertical coincidence filter stores the input signals and produces its own output signal only when input signals accumulate which indicate edge movement has occurred in a predetermined number of vertically adjacent horizontal scan lines.

5. The motion detector of claim 1 further including a motion analyzer which receives as input signals the output signals from a vertical coincidence filter, and wherein the motion analyzer stores the input signals and produces its own output signal only when input signals accumulate which indicates edge movement has occurred through a predetermined segment of the horizontal scan dimension of the camera viewing field.

* * * * *